Dec. 28, 1943.                I. S. TAFFAE                2,337,782
                          FLOWER HOLDING BARRETTE
                            Filed Nov. 16, 1942
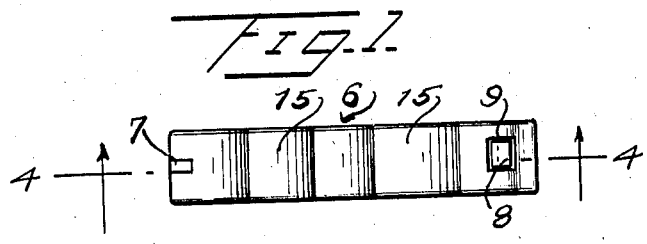
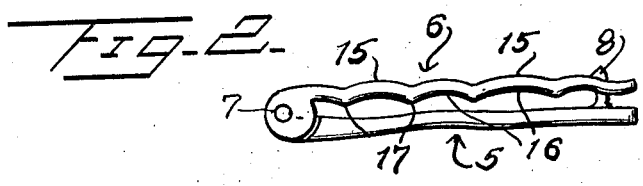
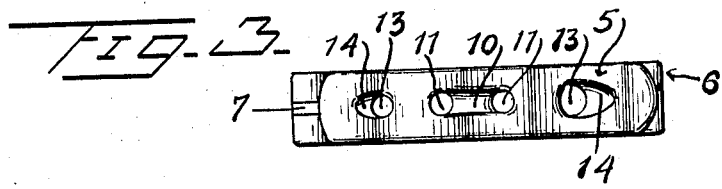
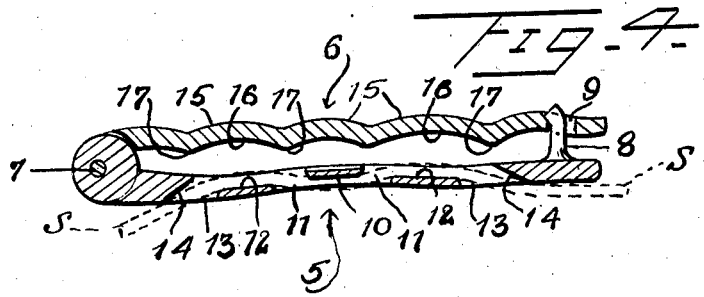
Inventor
I. S. Taffae Patented Dec. 28, 1943

2,337,782

UNITED STATES PATENT OFFICE 2,337,782

FLOWER HOLDING BARRETTE

Israel Sarge Taffae, Cedarhurst, N. Y.

Application November 16, 1942, Serial No. 465,753

7 Claims. (Cl. 24—5)

This invention relates to certain new and useful improvements in flower holding barrettes.

The primary object of the invention is to provide a barrette for clasping and holding a lock of hair and is preferably composed of a pair of hingedly connected leg members, with one of the leg members provided on opposite faces thereof with grooved portions extending lengthwise and an opening at each of the ends of the grooved portions so that the stem of a flower may be threaded through the openings and substantially lie within the grooved portions of the leg member and be effectively retained therein, the barrette performing the function of a flower holder.

It is a further object of the invention to provide a barrette of the foregoing character in which one leg of a hinged barrette is constructed for the support of a flower stem, while the other leg is of such appearance that it may be attractively exposed when flowers are not to be used. This leg, preferably corrugated or crenelated may, be exposed, if preferred, even when the barrette is in use as a flower holder to present a different effect. The arched portions of the corrugated or crenelated length of the leg, while adding to the appearance, are designed to provide clearances for any portions of the flower stem that may be positioned between the legs.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a plan view of a barrette constructed in accordance with the present invention and showing the corrugated side thereof.

Figure 2 is a side elevational view,

Figure 3 is a reverse plan view of the barrette showing the leg thereof constructed for the threaded attachment of the stem of a flower, and Figure 4 is a longitudinal sectional view taken on line 4—4 of Figure 1, the stem of a flower being illustrated by dotted lines.

The barrette may be constructed of any desired material, the same being preferably formed of a plastic and embodying a pair of leg members; the barrette may be of a construction simulating a resilient clasp, but for purposes of illustration the same is shown as embodying a pair of hingedly connected leg members having their free ends latchingly retained against opening movements.

The barrette comprises a pair of legs designated in general by the reference characters 5 and 6, corresponding ends of the leg members 5 and 6 being hingedly connected together as at 7. A latch connection between the other ends of the leg members 5 and 6 comprises a latch pin 8 rising from the leg member 5 with the free end of the latch pin 8 adapted to be retainingly received in an opening 9 in the leg member 6, the inherent resiliency or elasticity of the cast plastic leg members 5 and 6 permitting forceful separation of the leg members or the release of the latch pin 8 from its engagement with a wall of the opening 9.

An important feature of the present invention resides in the designing of the leg member 5 for the support of the stem of a flower so that the barrette, in addition to its function of holding a lock of hair, displays a flower for head-dress purposes. As shown more clearly in Figures 3 and 4, the outer face of the leg member 5 is provided with a longitudinally extending groove 10 intermediate the ends of the leg with an opening 11 extending through the leg at each end of the groove. The inner face of the leg member 5, as shown in Figure 4, is provided with two alined and suitably spaced longitudinally extending grooves 12 respectively extending toward the opposite ends of said legs from the openings 11; and, at the outer end of each groove 12, there is provided an opening 13. As shown in Figures 3 and 4 the wall portions of the end openings 13 adjacent the ends of the leg member 5 are beveled outwardly as at 14.

The cooperating leg member 6 of the barrette is transversely crenelated or corrugated throughout its length to provide outwardly arched portions 15 and inner concaved portions 16, two of which overlie the grooved portions 12 of the leg member 5. The crests or ridges 17 formed by the corrugations overlie the openings 11 and 13.

When the barrette is used as a flower holder for use in the hair or for other purposes, the leg members 5 and 6 are separated by movements on their hinge connections 7 after release of the latch connection 8—9 and the stem of a flower threaded through the openings and grooves in the leg member 5 as indicated by the reference character S in Figure 4. With the flower stem so disposed the main body portion thereof lies within the grooves 10 and 12. When the leg member 6 of the barrette is moved to its closed position for latching engagement with the leg member 5, the lock of hair between the leg members will be caused by such closing movement to exert some pressure on the flower stem S, the crests or ridges 17 forcing strands of the lock of hair toward the openings 11 and 13 for a more effective binding engagement with the stem of the flower. The beveled outer end walls 14 of the end openings 13 permit the flower stem to maintain a substantially straight line position without undue bending thereof which would result in breakage of the stem and wilting of a flower. Flowers may be changed at will, using the barrette as a holder therefor, and when it is desired to use the barrette solely as a hair holding device, the corrugated leg member 6 is disposed at the outer side for exposure of its simpler crenelated surface.

While there is herein shown and described the preferred embodiment of the invention, it is nevertheless to be understood that minor changes may be made therein without departing from the spirit and scope of the invention as claimed.

I claim:

1. A flower holder comprising a barrette-like hair clasp having a pair of flat bar-like legs hingedly connected together at corresponding ends, one leg of the clasp having a series of openings therein and opposite faces of said leg being alternately grooved between the openings for the reception of a flower stem.

2. A flower holder comprising a barrette-like hair clasp having a pair of flat bar-like legs hingedly connected together at corresponding ends, one leg of the clasp having a series of openings therein and opposite faces of said leg being alternately grooved between the openings for the reception of a flower stem and the end walls of the end openings being beveled outwardly whereby a flower stem may extend from the leg in a substantially straight line without breakage thereof.

3. In a barrette of the character described, a pair of flat bar-like leg members hingedly connected together at corresponding ends, one of said leg members being constructed for the threaded reception of a flower stem and the other leg member being designed for exposure when flowers are not to be used, the flower stem holding leg having a series of openings therein and opposite faces of the leg being alternately grooved between the openings for the reception of the flower stem.

4. In a barrette of the character described, a pair of flat bar-like leg members hingedly connected together at corresponding ends, one of said leg members being constructed for the threaded reception of a flower stem and the other leg member being of a suitably simpler design, the flower stem holding leg having a series of openings therein and opposite faces of the leg being alternately grooved between the openings for the reception of the flower stem, and the end walls of the end opening being beveled outwardly whereby a flower stem may extend from the leg in a substantially straight line without breakage thereof.

5. In a barrette of the character described, a pair of flat bar-like leg members hingedly connected together at corresponding ends, one of said leg members being constructed for the threaded reception of a flower stem and the other leg member being designed for exposure when flowers are not to be used, the latter leg being transversely corrugated providing ridges directed inwardly toward the flower supporting leg with the ridges overlying the leg openings for binding engagement with a flower stem.

6. In a barrette of the character described, a pair of flat bar-like leg members hingedly connected together at corresponding ends, one of said leg members being constructed for the threaded reception of a flower stem and the other leg member being of a suitably simpler design, the flower stem holding leg having a series of openings therein and opposite faces of the leg being alternately grooved between the openings for the reception of the flower stem, the other leg being transversely corrugated providing ridges directed inwardly toward the flower supporting leg with the ridges overlying the leg openings for binding engagement with a flower stem.

7. In a barrette of the character described, a pair of flat bar-like leg members hingedly connected together at corresponding ends, one of said leg members being constructed for the threaded reception of a flower stem and the other leg member being of a suitably simpler design, the flower stem holding leg having a series of openings therein and opposite faces of the leg being alternately grooved between the openings for the reception of the flower stem, and the end walls of the end openings being beveled outwardly whereby a flower stem may extend from the leg in a substantially straight line without breakage thereof, the other leg being transversely corrugated providing ridges directed inwardly toward the flower supporting leg with the ridges overlying the leg openings for binding engagement with a flower stem.

ISRAEL SARGE TAFFAE.